United States Patent
Wang (10) Patent No.: US 8,939,836 B2
(45) Date of Patent: Jan. 27, 2015

(54) INTERACTIVE GAME CONTROLLING METHOD FOR USE IN TOUCH PANEL DEVICE MEDIUM

(71) Applicant: Fourier Information Corp., Taipei (TW)

(72) Inventor: Yi-Chen Wang, Taipei (TW)

(73) Assignee: Fourier Information Corp., Taipei (TW)

(*) Notice: Subject to any disclaimer, the term of this patent is extended or adjusted under 35 U.S.C. 154(b) by 122 days.

(21) Appl. No.: 13/860,413

(22) Filed: Apr. 10, 2013

(65) Prior Publication Data

US 2013/0288790 A1 Oct. 31, 2013

(30) Foreign Application Priority Data

Apr. 25, 2012 (TW) .............................. 101114801 A (51) Int. Cl.

| A63F 13/10 | (2006.01) |
|---|---|
| A63F 13/20 | (2014.01) |
| A63F 13/837 | (2014.01) |
| A63F 13/426 | (2014.01) |
| A63F 13/5255 | (2014.01) |
| A63F 13/2145 | (2014.01) |

(52) U.S. Cl.
CPC ............... *A63F 13/06* (2013.01); *A63F 13/837* (2013.01); *A63F 13/426* (2013.01); *A63F 13/5255* (2013.01); *A63F 13/2145* (2013.01)
USPC .............................................. 463/31; 463/37

(58) Field of Classification Search
CPC .... G07F 17/3211; G07F 17/322; A63F 13/10
USPC ...................................... 463/31, 37
See application file for complete search history.

(56) References Cited

U.S. PATENT DOCUMENTS

| 8,717,443 | B2* | 5/2014 | Kaehler et al. ................. 348/187 |
|---|---|---|---|
| 2012/0108337 | A1* | 5/2012 | Kelly et al. ..................... 463/37 |

* cited by examiner

*Primary Examiner* — Pierre E Elisca (57) ABSTRACT

The present invention relates to an interactive game controlling method for use in a touch panel device medium. The game includes a virtual hot zone, a virtual display range, at least one self-acting virtual object displayed on the touch panel device. An interactive program that allows users to interact with the virtual object in the virtual hot zone is executed in response to a finger tapping on the virtual hot zone. The method includes the steps of: a) receiving a touch and sensing the motion of the touch; b) moving the virtual display range where the virtual object is included in a direction opposite to the direction which the touch is moving; c) executing the interactive program to allow the user to interact with the virtual object when the virtual object is relocated to the virtual hot zone and the virtual hot zone receives a change in state of touch.

7 Claims, 7 Drawing Sheets

INTERACTIVE GAME CONTROLLING METHOD FOR USE IN TOUCH PANEL DEVICE MEDIUM

FIELD OF THE INVENTION

The present invention relates to a game controlling method, and more particularly, to an interactive game controlling method for use in a touch panel device medium.

DESCRIPTION OF THE RELATED ART

With the development of touch control technology, it is nowadays possible to use it in many application fields. For example, the touch screens have been broadly equipped not only on gigantic public equipments like automatic teller machines (ATMs) and Karaokes but also on personal consumer products, such as personal digital assistants (PDAs), Smart-phones and personal computers (PCs). Taking advantage of the touch control technology, touch games have become so popular though they have only appeared for a few years. The rising of touch games depends on some strong points. For example, touch games are more intuitive, user-friendly in its touch operation than the conventional video games. These advantages make touch games be in great demand.

It should be noted that the design and development of touch games, in contrast to those of the conventional video games, are particularly focused on the mode of touch operation. The mode of touch operation is the decisive factor of the playability of touch games, and this is particularly true for the games to be played on a PDA or a smart-phone. Player's movements in a baseball game, for example, may be designed to define a sliding movement as a command of pitching a ball and a single tapping operation as a command of swinging the bat. In some cases, touch games are designed to display a row of virtual control buttons adapted to be selectively pressed by the user. More preferably, the mode of touch operation can be adjusted with different hardware specifications.

Figure 1:
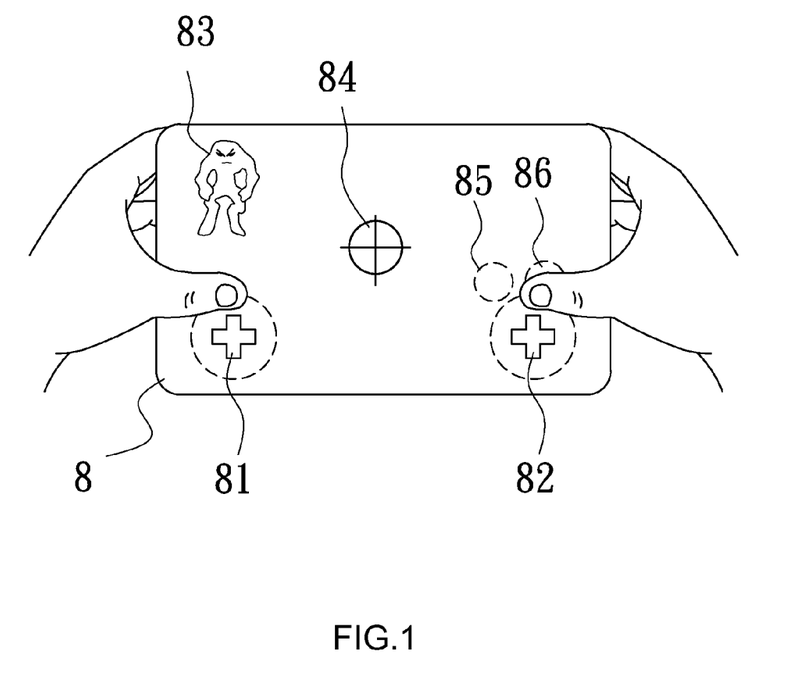
FIGS. 1-2 are schematic diagrams of a conventional FPS displayed on the touch panel.
Figure 2:
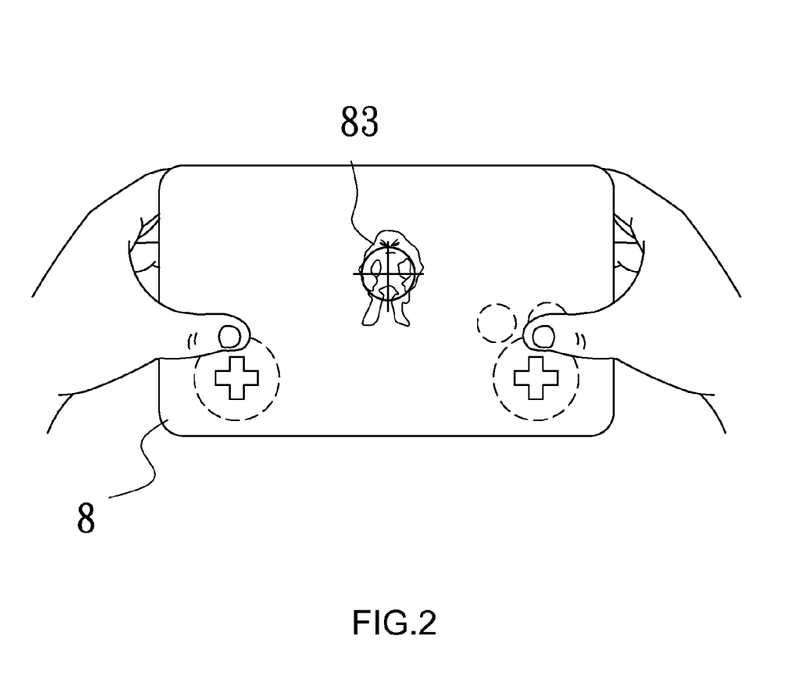

FIG. 1 shows a current method for controlling a first-person shooter game (FPS). In a FPS gaming process, players are required to control the character and change visual angles to search the enemy at the same time. For example, a common FPS is typically controlled by a handgrip or by a keyboard and a computer mouse, so that a player can give complicated instructions by the respective fingers of right and left hands. This operation logic is normally passed along when a FPS is transplanted from a computer to a smart-phone and a PDA. Therefore, a movement controlling button 81 is displayed on the lower left of the touch panel 8, and the visual angle controlling button 82 is displayed on the lower right. When the character controlled by the player encounters an enemy 83, the player, in the hope of aiming the enemy 83 as shown in FIG. 2, could use the visual angle controlling button 82 to change the visual angle until the enemy 83 enters the shooting area 84 in the center of the screen, and then press the zooming button 85 to enlarge the image and press the fire button 86 to shoot forwards.

A problem would occur when the player holds the touch panel with both hands. The player has to hold the touch panel with four fingers each hand, only leaving two thumbs to control more than two virtual buttons. It means that the visual angle controlling button 82, the zooming button 85 and the fire button 86 cannot be pressed at same time. For example, when the player relocates the enemy 83 within the shooting area 84 upon pressing the visual angle controlling button 82 as shown in FIG. 2, the player need to move the thumb of right hand to press the fire button 86. This finger movement, however, would give a chance to the enemy 83 to run out of the shooting area 84 at this moment. If it is the case, the player would have to repeat the previous step to re-catch the enemy 83. The enemy 83 will run out of shooting area 84 again and again if this problem has not solved.

The design of virtual buttons described above places the player in a hurry-scurry state. Besides, the space of a Smartphone screen is not board enough. It gets worse when the player put their thumbs in two sides of the screen. Such being the case, the practical size of the images of the game is typically designed to be much smaller than the size of a Smartphone screen. In contrast, it's easier for a player to player the game when using a computer with a keyboard and a computer mouse or using an arcade game machine with a handgrip.

Therefore, when a touch game requires a player to control multiple serially arranged virtual buttons by two thumbs, it is impossible for the player to input multiple commands, such as searching enemies, aiming the target and shooting, in a short period of time. On the one hand, the operational accuracy of the player is limited by the design of virtual buttons, making the game interface unfriendly to the player. Meanwhile, the player cannot thoroughly enjoy the game due to the limitation of operability, reducing the playability of the game. Therefore, there is a need for a game controlling method that is capable of providing greater operability of the touch control games and allow multiple complicated commands, thus greatly improving the control convenience for players.

In view of the drawbacks described above, the invention provides a game controlling method, which is adapted to detect and identify the number of one or more initial points of a touch and sense the motion of the touch. The interactive game includes a virtual hot zone, and an interactive program will be executed in response to a finger tapping on the virtual hot zone. These technical features allow the manufacturers of touch games to develop games that are easier-to-operate and friendly to the players, and can be played by inexperienced game players. It also allows sending multiple complicated commands, which further improves the playability of the game. The game controlling method proposed in this invention can resolve the aforementioned problems encountered by the conventional touch games played on touch panels.

SUMMARY OF THE INVENTION

The first aspect of this invention is to provide an interactive game controlling method for use in a touch panel device medium, so as to impart the touch panel device medium an improved convenience of game operations.

The second aspect of this invention is to provide an interactive game controlling method that improves the game operation mode by performing a movement in a direction opposite to the direction to which the touch is moving.

The third aspect of this invention is to provide an interactive game controlling method, by which multiple commands may be so integrated as to be executed consecutively in a short period of time, thereby increasing the delicacy of the game.

The fourth aspect of this invention is to provide an interactive game controlling method for use in a touch panel device medium without using any virtual buttons, thereby maximizing the visual area of the panel.

The invention provides an interactive game controlling method for use in a touch panel device medium comprising a touch panel device provided with a plurality of cells and a processor device, wherein the touch panel device is adapted to detect and identify the number of one or more initial points of a touch and sensing the subsequent motion of the touch; and wherein the interactive game includes a virtual hot zone, a virtual display range and at least one self-acting virtual object displayed on the touch panel device, and wherein an interactive program that allows a user to interact with the at least one self-acting virtual object in the virtual hot zone is executed in response to a finger tapping on the virtual hot zone, the interactive game controlling method comprising the steps of: a) receiving a touch and sensing the motion of the touch; b) moving the virtual display range where the at least one self-acting virtual object is included in a direction opposite to the direction to which the touch is moving; and c) executing the interactive program to allow the user to interact with the at least one self-acting virtual object when the at least one self-acting virtual object is relocated to the virtual hot zone and the virtual hot zone receives a change in state of touch.

According to the technical features disclosed herein, the invention executes the designated programs corresponding to the respective changes in finger touch on the touch screen. By doing so, it allows the player to hold the game medium with one hand while controlling multiple complicated commands with the other hand, so as to improve the convenience of the game operations, keep the fun in gaming, make the game interface more friendly to the player, and further facilitate the game designer to develop more highly operational games.

BRIEF DESCRIPTION OF THE DRAWINGS

The above and other objects, features and effects of the invention will become apparent with reference to the following description of the preferred embodiments taken in conjunction with the accompanying drawings, in which.

DETAILED DESCRIPTION OF THE INVENTION

The foregoing and other features and advantages of the invention may be more completely understood in consideration of the following detailed description of various embodiments of the invention in connection with the accompanying drawings, wherein similar numerals designate like parts.

Figure 3:
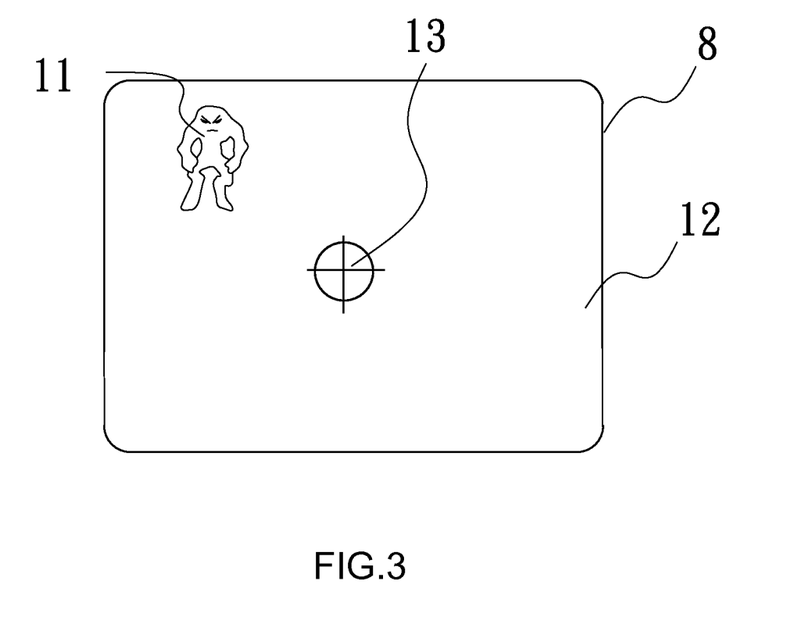
FIG. 3 is a schematic diagram of a FPS displayed on the touch panel according to the first preferred embodiment of the invention.

As shown in FIG. 3, the touch panel device medium, in which the interactive game controlling method according to the invention is to be used, includes a conventional touch panel device 8 and a processor device (not shown) provided in the touch panel device 8. The touch panel device 8 comprises multiple pixels to make up images on the screen and is adapted to detect and identify the number of finger touches and the state and speed of finger motions on the touch panel device 8 and then transmit the received signals to the processor device. The received signals are computed in the processor device and then presented in the form of images and/or audio information in accordance with the executed program, which are adapted for the user to watch or identify. According to this embodiment, the interactive game controlling method is illustrated as a first-person shooter game (FPS) as shown in FIG. 3. For the purpose of convenience in illustration, an area in the touch panel device is defined to be a virtual display range 12, and a visual hot zone is demonstrated as a foresight of a gun at the center of FIG. 3 and illustrated herein as a virtual shooting zone 13. Any virtual figure that is displayed on the touch panel device without controlled by the user is defined as a self-acting virtual object 11.

Figure 4:
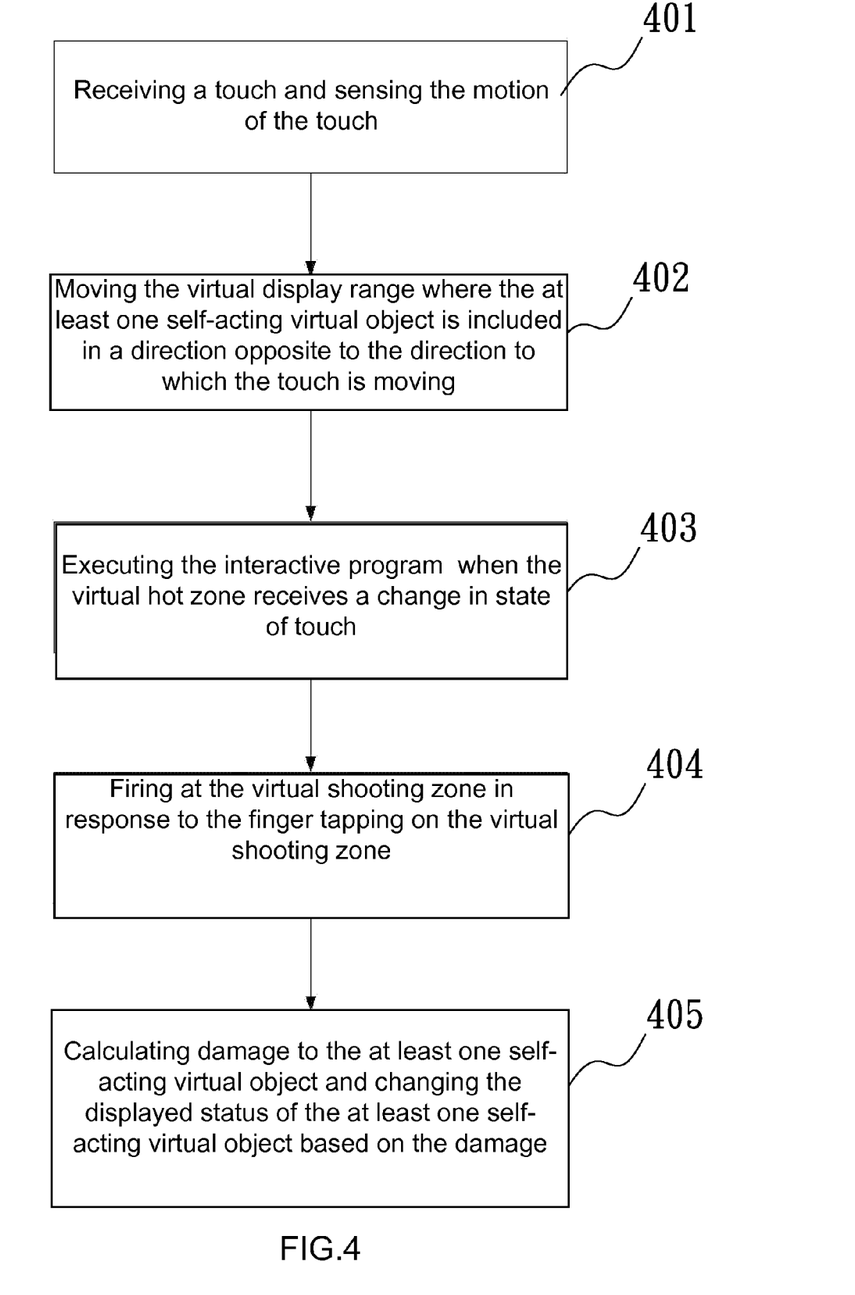
FIG. 4 is a flowchart of the interactive game controlling method according to the first preferred embodiment of the invention.

Now referring to the flow chart shown in FIG. 4, the touch panel device 8 initially receives a finger touch in Step 401. In this embodiment, the touch panel device 8 detects and identifies the number of the initial points of the finger touch and senses the subsequent motion of the finger touch. In Step 402, when the touch panel device 8 identifies that the finger touch has one initial touch point and the subsequent motion of the finger touch is a finger dragging motion, the virtual display range 12 is moved in a direction opposite to the direction to which the finger dragging motion is advancing.

Figure 5:
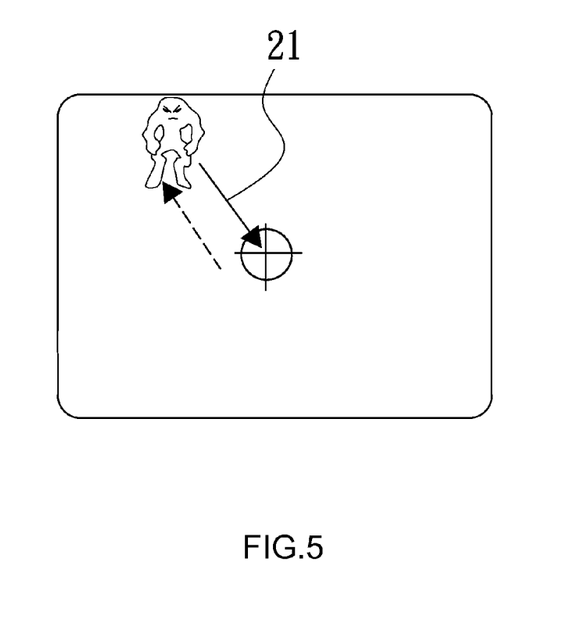
FIGS. 5-6 are schematic diagrams of a FPS displayed on the touch panel according to the first preferred embodiment of the invention.

Afterwards, when the touch panel device 8 displays the self-acting virtual object 11, namely, an enemy character, at top-left of the gaming image as shown in FIG. 5, and the virtual shooting zone 13 is shown at the center of gaming image, the player may want to relocate the enemy character within the virtual shooting zone 13 to expose the enemy character under his/her gun fire. Unlike the conventional video games where the player has to turn gun muzzle to aim at the enemy character, the method according to this embodiment allows the player to touch the enemy character with a finger and then drag the enemy character right-downwardly as indicated by the solid arrow to relocate it within the virtual shooting zone 13. That is to say, the finger dragging motion inputs a vector 21 for dragging the enemy character into the virtual shooting zone 13, by which the processor device generates an opposite vector having an equal magnitude (as indicated by the dashed arrow). The opposite vector controls the rotation and movement of the visual angle of the gaming image, so that the virtual display range 12 is moved left-upwardly in an opposite direction of the vector 21, whereby the self-acting virtual object 11 located in the virtual display range 12 looks as if it is shifted right-downwardly.

Figure 6:
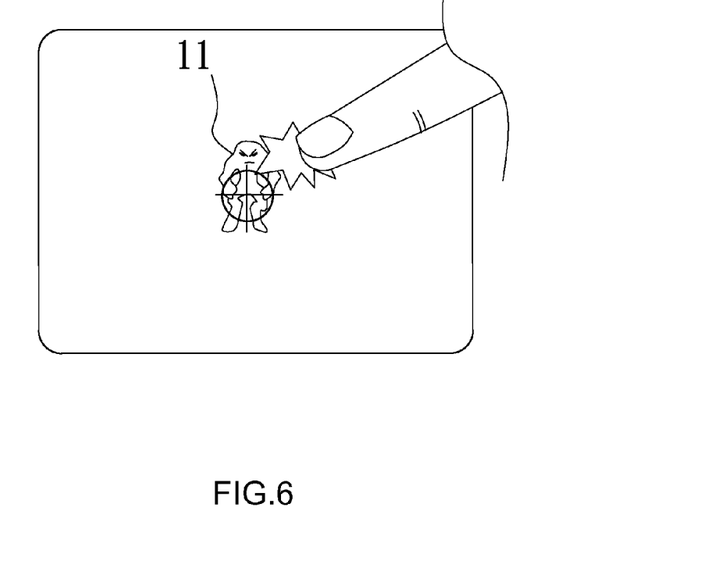

The following step 403 is shown in FIG. 6. When the self-acting virtual object 11 is placed at the virtual shooting zone 13, the player could tap on the virtual shooting zone 13, which is located at the center of touch panel device 8, to open fire. The processor device activates an interactive firearm firing program when the virtual shooting zone 13 senses the finger tapping and, therefore, receives a change in state of touch. In Step 404, the player interacts with the self-acting virtual object 11 by activating the firearm firing program to open fire at the virtual shooting zone 13. Finally, in Step 405, the damage to the self-acting virtual object 11 is calculated based on the region tapped by the finger. For example, there would cause minor damage to the enemy if the player only attacks the enemy's limb. On the contrary, the enemy would be one hit killed if player attacks the enemy's vital point. Meanwhile, the displayed status of the virtual object is changed based on the damage.

Figure 7:
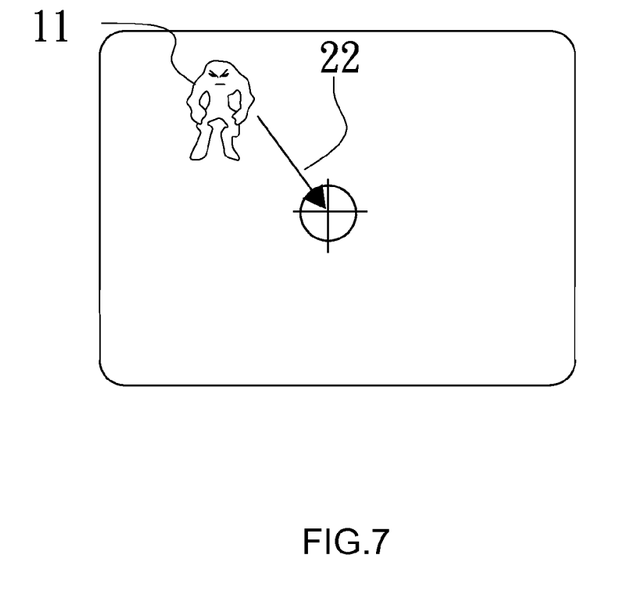
FIGS. 7-9 are schematic diagrams of a FPS displayed on the touch panel according to the second preferred embodiment of the invention.
Figure 8:
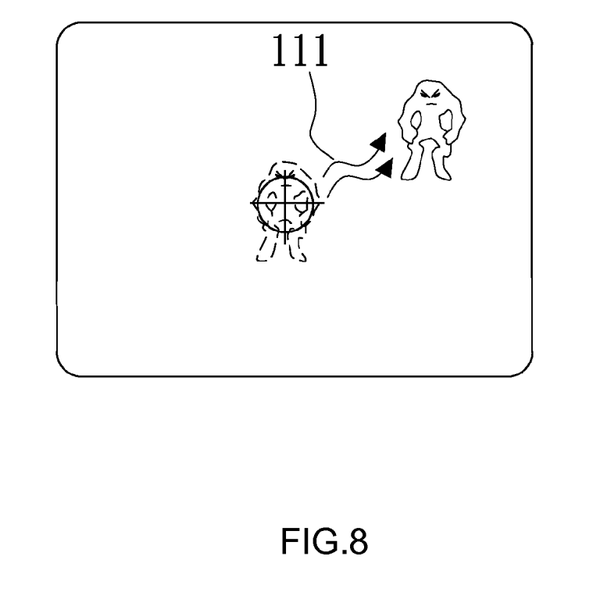
Figure 9:
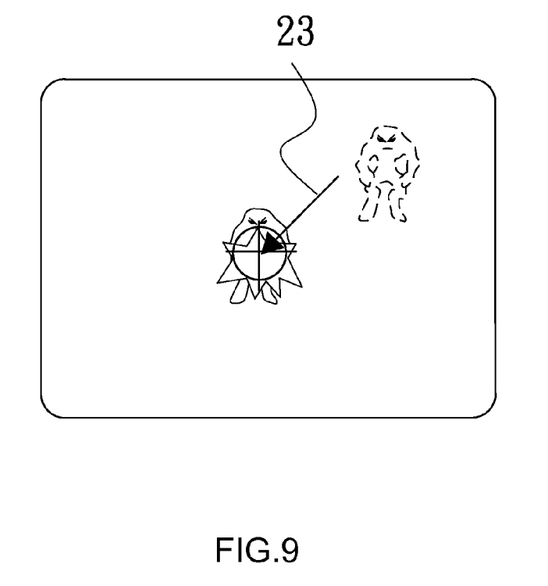

It is apparent to those who have ordinary skill in the art that the change in state of touch described above is not limited to the finger tapping on the virtual shooting zone 13 after the enemy character enters the virtual shooting zone 13, but also includes stopping the finger dragging motion after the enemy character is moved into the virtual shooting zone 13 and removing the finger from the touch panel device, which is defined herein as a release of the finger dragging motion. Therefore, the state of touch is illustrated to be a finger dragging motion according to the second preferred embodiment of the invention as shown in FIG. 7. In the case where the player doesn't release the finger dragging motion immediately after the enemy character is dragged within the virtual shooting zone 13 by the vector 22, the enemy would be able to escape right upwards following a path 111 as indicated by the dotted line. In this case, the player may relocate the enemy character to the center of gaming image by inputting a vector 23 which is opposite to the direction which the enemy character is escaping along the path 111. As shown in FIG. 9, when the enemy is relocated within the virtual shooting zone, the player may fire at the virtual shooting zone by releasing the finger dragging motion within the virtual shooting zone while changing the visual angle.

As such, when the player drags the enemy character to the virtual shooting zone with a finger and then removes the finger from the touch panel device, the processor device moves and shifts the virtual display range in a direction opposite to the finger dragging direction to track the enemy character and immediately activates the firearm firing program to open fire at the enemy character now relocated within the virtual shooting zone in response to the removal of the finger from the touch panel device. By virtue of the technical features described above, the command of moving the virtual shooting zone is integrated with the command of opening fire, thereby simplifying the operation. In short, taking advantage of the simplified operation mode, the present invention not only improves the convenience of changing the visual angle of the gaming image, but also realizes an integrated operation of changing the visual angle of the gaming image and firing at the virtual shooting zone. Therefore, the present invention greatly facilitates the diversity and convenience in game controlling.

Figure 10:
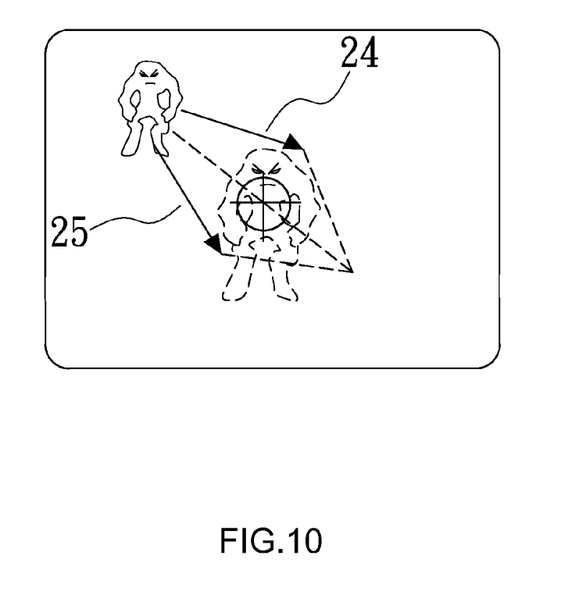
FIG. 10 is a schematic diagram showing the step of zooming-in and zooming-out according to the third preferred embodiment of the invention.

Some conventional video games provide a virtual button for the player to adjust the visual field. As described above, the addition of the virtual bottom could result in an operational burden to the player. According to the third preferred embodiment of the invention shown in FIG. 10, in the case where the player touches the touch panel device with two fingers concurrently, the touch panel device detects and identifies a two-point touch which is distinct from a one-point touch. When the player touches the enemy character with two fingers and subsequently moves the two fingers toward a certain direction along the surface of the touch panel device while sliding the two fingers away from each other to increase an interval therebetween, the finger movement generates two motion vectors 24, 25, whereby the virtual display range is zoomed-in and the enemy character is relocated at the midpoint of the end points of the two vectors 24, 25 using one-half of the sum vector of the two vectors 24, 25 as a motion vector for relocating the enemy character. Due to the three vectors, the player may enlarge the size of the enemy character while dragging it to a certain spot simultaneously. Meanwhile, the processor device is programmed to open fire when the enemy character is relocated within the virtual shooting zone. Accordingly, the embodiment disclosed herein integrates the command of zooming-in the virtual display range, the command of relocating the enemy character and the command of opening fire.

Figure 11:
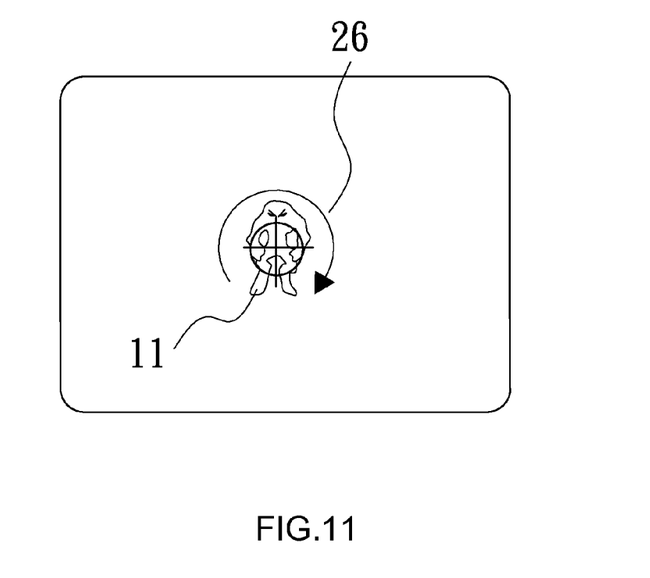
FIG. 11 is a schematic diagram showing the step of getting target locked-on according to the fourth preferred embodiment of the invention.

Furthermore, according to the fourth preferred embodiment of the invention as shown in FIG. 11, the invention comprises an automatic lock-on function. That is to say, when the self-acting virtual object 11 enters the virtual shooting zone, the player could input a lock-on command by, for example, drawing a circle surrounding the self-acting virtual object 11, so that the self-acting virtual object 11 is locked-on in the virtual shooting zone, allowing the virtual shooting zone and the virtual display range to intimately follow up the movement of the self-acting virtual object 11. As the self-acting virtual object 11 is locked on, the player can take his time to perform other actions. For example, the player can switch his weapon from one to another, and then calmly taps on the self-acting virtual object 11 to annihilate it.

Figure 12:
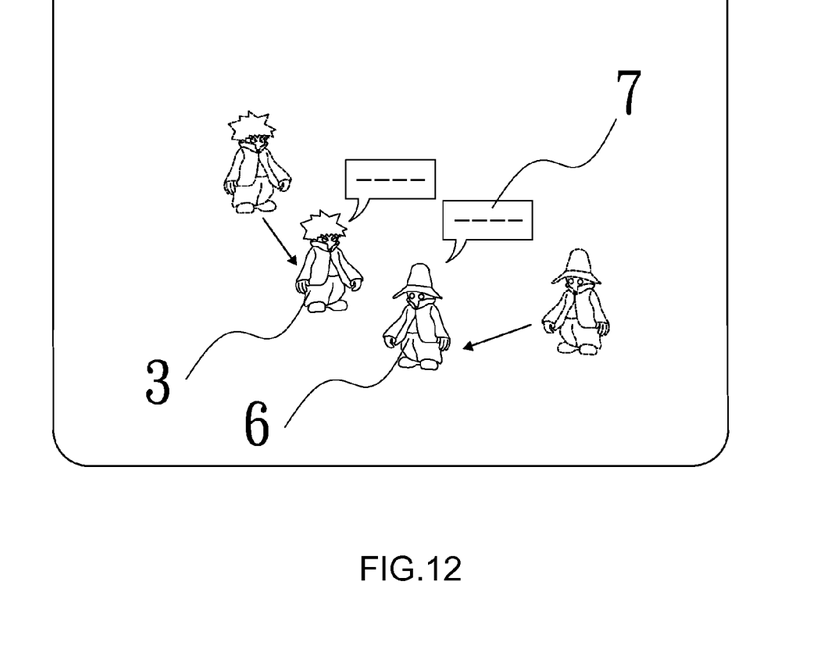
FIG. 12 is a schematic diagram showing the application of the present invention to a role-playing game according to the fifth preferred embodiment of the invention.

It should be noted that the concept of the present invention is not limited for use in a shooting game and is also applicable to a role-playing games (abbreviated as R.P.G.) as described below, in which the virtual hot zone is a virtual conversation area. According to the fifth preferred embodiment of the invention shown in FIG. 12, the character 3 controlled by the player may be locked-on to track the movement of a non-player character 6 (NPC 6). During the period of locked-on, the player can focus on management of the dialog box 7 which shows the dialogue with NPC. The invention can also be used when the player finds a treasure chest or a gate. In this case, the treasure chest and the gate each functions as a self-acting virtual object adapted to be opened up when dragged to a central spot of the gaming image.

By virtue of moving the virtual display range in a direction opposite to the direction to which the finger dragging motion is advancing as a means to track the self-acting virtual object in combination with performing a change in state of touch, such as a finger-tapping and a release of finger dragging motion, on the virtual hot zone, the invention generates a variety of virtual activities on a touch panel device by executing predetermined processing programs corresponding to the respective virtual activities, without using multiple complicated commands. Therefore, in the light of the technical features disclosed herein, the gaming operation becomes more easily than the conventional video games and simply requires changing touch points and touch state to accurately realize a variety of virtual activities. It doesn't need to keep one eye on many things, the player would not fall into the situation of multitasking when playing the game. In this way, it reduces the operational complexity of the game.

It should be noted that the visual hot zone can be displayed elsewhere besides at the center of the touch panel device, such as at a lower central spot, at a left central spot or at a right central spot of the touch panel device, depending on design need. It is unnecessary for the visual hot zone to be shown in the form of a circle or other geometric shapes, as long as the player can clearly know where it is according to the game instructions.

In summary, the interactive game controlling method disclosed herein provides different operation modes responsive to different numbers of touch points and touch motions. As a result, the player doesn't have to concern about the state of each operation command at all times. On one hand, it makes the game more user-friendly and easy-to-play. On the other hand, the player doesn't have to carry out every operation by himself, but leaves some commands to be executed by the processor device. In this way, the player could focus on the command control in other aspects, so as to lower the complexity of the game. The invention goes out of the boundary of the virtual buttons, thus facilitating the use of the medium space and expanding the visual area of the screen. The invention is also applicable to laptop computers, smart phones, portable game stations and so on.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention.

What is claimed is:

1. An interactive game controlling method for use in a touch panel device medium comprising a touch panel device provided with a plurality of cells and a processor device, wherein the touch panel device is adapted to detect and identify the number of one or more initial points of a touch and sensing the motion of the touch; and wherein the interactive game includes a virtual hot zone, a virtual display range and at least one self-acting virtual object displayed on the touch panel device, and wherein an interactive program that allows a user to interact with the at least one self-acting virtual object in the virtual hot zone is executed in response to a finger tapping on the virtual hot zone, the interactive game controlling method comprising the steps of:
   a) receiving a touch and sensing the motion of the touch;
   b) moving the virtual display range where the at least one self-acting virtual object is included in a direction opposite to the direction to which the touch is moving; and
   c) executing the interactive program to allow the user to interact with the at least one self-acting virtual object when the at least one self-acting virtual object is relocated to the virtual hot zone and the virtual hot zone receives a change in state of touch.

2. The interactive game according to claim 1, wherein the interactive game is a shooting game and the virtual hot zone is a virtual shooting zone, and wherein the change in state of touch in the step c) is a finger tapping, and wherein the interactive program is a firearm firing program and the step c) comprises the sub-steps of:
   c1) firing at the virtual shooting zone in response to the finger tapping on the virtual shooting zone; and
   c2) calculating damage to the at least one self-acting virtual object and changing the displayed status of the at least one self-acting virtual object based on the damage.

3. The interactive game according to claim 2, further comprising, subsequent to the step b), a step d) of zooming-in the virtual display range with respect to the touch point, so that the at least one self-acting virtual object is enlarged proportionally within the virtual display range.

4. The interactive game according to claim 2, further comprising, subsequent to the step b), a step e) of locking the at least one self-acting virtual object in the virtual shooting zone when the at least one self-acting virtual object is relocated to the virtual shooting zone, so that the virtual display range is moving along with the at least one self-acting virtual object.

5. The interactive game according to claim 1, wherein the interactive game is a shooting game and the virtual hot zone is a virtual shooting zone, and wherein the motion of the touch in step a) is a finger dragging motion and the change in touch condition in the step b) is a release of the finger dragging motion, and wherein the interactive program is a firearm firing program and the step c) comprises the sub-steps of:
   c3) firing at the virtual shooting zone in response to the release of the finger dragging motion within the virtual shooting zone; and
   c4) calculating damage to the at least one self-acting virtual object and changing the displayed status of the at least one self-acting virtual object based on the damage.

6. The interactive game according to claim 5, further comprising, subsequent to the step b), a step d) of zooming-in the virtual display range with respect to the touch point, so that the at least one self-acting virtual object is enlarged proportionally within the virtual display range.

7. The interactive game according to claim 5, further comprising, subsequent to the step b), a step e) of locking the at least one self-acting virtual object in the virtual shooting zone when the at least one self-acting virtual object is relocated to the virtual shooting zone, so that the virtual display range is moving along with the at least one self-acting virtual object.

* * * * *